(12) United States Patent
Selfridge et al.

(10) Patent No.: US 10,900,418 B2
(45) Date of Patent: Jan. 26, 2021

(54) FUEL PREHEATING SYSTEM FOR A COMBUSTION TURBINE ENGINE

(71) Applicant: General Electric Company, Schenectady, NY (US)

(72) Inventors: Kenneth Eugene Selfridge, Piedmont, SC (US); Douglas Frank Beadie, Greer, SC (US); Alberto Jose Negroni, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 343 days.

(21) Appl. No.: 15/718,705

(22) Filed: Sep. 28, 2017

(65) Prior Publication Data
US 2019/0093563 A1    Mar. 28, 2019

(51) Int. Cl.
| | | |
|---|---|---|
| *F02C 7/224* | (2006.01) | |
| *F22B 1/18* | (2006.01) | |
| *F01K 7/18* | (2006.01) | |
| *F01K 23/10* | (2006.01) | |
| *F02C 6/18* | (2006.01) | |

(Continued)

(52) U.S. Cl.
CPC ............... *F02C 7/224* (2013.01); *F01K 7/18* (2013.01); *F01K 23/10* (2013.01); *F02C 6/18* (2013.01); *F22B 1/1815* (2013.01); *F22D 5/28* (2013.01); *F01K 13/02* (2013.01); *F05D 2220/32* (2013.01); *F05D 2220/76* (2013.01); *F05D 2240/35* (2013.01); *F05D 2260/207* (2013.01)

(58) Field of Classification Search
CPC ...................................................... F02C 7/224
See application file for complete search history.

(56) References Cited

U.S. PATENT DOCUMENTS 4,785,622 A * 11/1988 Plumley ............... F01K 21/042
60/39.12
5,588,400 A * 12/1996 Stefan ................... F22B 1/1815
122/33

(Continued)

FOREIGN PATENT DOCUMENTS

| DE | 102007054467 A1 * | 5/2009 | ........... F01K 23/106 |
|---|---|---|---|
| EP | 0931911 B1 * | 6/2006 | ........... F01K 23/106 |
| EP | 2824294 A1 | 1/2015 | |

*Primary Examiner* — Gerald L Sung
*Assistant Examiner* — Marc J Amar
(74) *Attorney, Agent, or Firm* — Fletcher Yoder, P.C.

(57) ABSTRACT

A combined cycle power plant that includes a gas turbine and HRSG engaged with a steam turbine via a water steam cycle having higher and lower pressure levels. The CCPP further includes a fuel line and fuel preheater. A higher pressure feedwater line delivers higher pressure feedwater to a higher pressure feedwater branch that extends through the fuel preheater, the high pressure feedwater branch including upstream and downstream segments defined to each side of the fuel preheater. A lower pressure feedwater line delivers lower pressure feedwater to a lower pressure feedwater branch. The downstream segment of the higher pressure feedwater branch is combined with the lower pressure feedwater branch at a junction point and a combined feedwater line extends therefrom. A first heat exchanger exchanges heat between the combined feedwater line and fuel line. A second heat exchanger exchanges heat between the higher pressure feedwater branch and fuel line.

20 Claims, 4 Drawing Sheets

(51) Int. Cl.
*F22D 5/28* (2006.01)
*F01K 13/02* (2006.01)

(56) References Cited

U.S. PATENT DOCUMENTS

| | | | | |
|---|---|---|---|---|
| 6,269,626 | B1 * | 8/2001 | Kim | F01K 23/106 |
| | | | | 122/7 B |
| 6,389,794 | B2 * | 5/2002 | Ranasinghe | F01K 23/106 |
| | | | | 60/39.182 |
| 6,499,302 | B1 * | 12/2002 | Ranasinghe | F01K 23/106 |
| | | | | 60/39.182 |
| 6,889,506 | B2 * | 5/2005 | Grewe | F01K 23/068 |
| | | | | 60/39.094 |
| 6,920,760 | B2 * | 7/2005 | Schottler | F01K 23/106 |
| | | | | 60/39.182 |
| 8,205,451 | B2 * | 6/2012 | Narayan | F01K 23/106 |
| | | | | 60/736 |
| 8,505,309 | B2 * | 8/2013 | Gardiner | F02C 6/18 |
| | | | | 60/39.182 |
| 9,109,513 | B2 * | 8/2015 | Fujita | F02C 7/143 |
| 9,903,276 | B2 * | 2/2018 | Hotta | F01K 23/10 |
| 10,006,313 | B2 * | 6/2018 | Drouvot | F01K 17/025 |
| 10,113,932 | B2 * | 10/2018 | Inoue | F02C 6/18 |
| 10,260,419 | B2 * | 4/2019 | Cerny | F02C 7/16 |
| 10,352,246 | B2 * | 7/2019 | Sumimura | F01K 7/38 |
| 2001/0023576 | A1 * | 9/2001 | Rollins, III | F01K 23/105 |
| | | | | 60/772 |
| 2001/0049934 | A1 * | 12/2001 | Ranasinghe | F01K 23/106 |
| | | | | 60/39.182 |
| 2003/0000214 | A1 * | 1/2003 | Grewe | F01K 23/068 |
| | | | | 60/670 |
| 2003/0000218 | A1 * | 1/2003 | Ranasinghe | F01K 23/106 |
| | | | | 60/772 |
| 2004/0011019 | A1 * | 1/2004 | Schottler | F01K 23/106 |
| | | | | 60/39.182 |
| 2007/0017207 | A1 * | 1/2007 | Smith | F01K 21/047 |
| | | | | 60/39.182 |
| 2010/0031660 | A1 * | 2/2010 | Narayan | F02C 7/224 |
| | | | | 60/734 |
| 2010/0031933 | A1 * | 2/2010 | Narayan | F01K 23/10 |
| | | | | 123/543 |
| 2010/0263605 | A1 * | 10/2010 | Sengar | F22G 5/123 |
| | | | | 122/31.1 |
| 2011/0173948 | A1 * | 7/2011 | Fujita | F02C 6/18 |
| | | | | 60/39.182 |
| 2012/0317988 | A1 * | 12/2012 | Gardiner | F02C 6/18 |
| | | | | 60/772 |
| 2013/0074508 | A1 * | 3/2013 | Sholes | F02C 6/003 |
| | | | | 60/772 |
| 2014/0069078 | A1 * | 3/2014 | Tong | F01K 23/10 |
| | | | | 60/39.182 |
| 2015/0007575 | A1 * | 1/2015 | Drouvot | F01K 17/025 |
| | | | | 60/772 |
| 2015/0361346 | A1 * | 12/2015 | West | F23J 13/08 |
| | | | | 202/254 |
| 2016/0003159 | A1 * | 1/2016 | Hotta | F01K 23/10 |
| | | | | 60/736 |
| 2016/0230606 | A1 | 8/2016 | Bruckner et al. | |
| 2017/0010176 | A1 * | 1/2017 | Inoue | F02C 6/18 |
| 2017/0030266 | A1 * | 2/2017 | Cerny | F02C 7/16 |
| 2017/0102148 | A1 * | 4/2017 | Olsen | F23R 3/42 |
| 2018/0363557 | A1 * | 12/2018 | Sumimura | F02C 7/224 |

* cited by examiner

FUEL PREHEATING SYSTEM FOR A COMBUSTION TURBINE ENGINE

BACKGROUND OF THE INVENTION

The invention refers to a combined cycle power plant with integrated fuel preheating. The invention additionally refers to a method for operating a combined cycle power plant with integrated fuel preheating.

In general, a combustion or gas turbine engine ("gas turbine") includes a compressor, combustor, and turbine. The compressor and turbine generally include rows of blades that are axially stacked in stages. Each stage includes a row of circumferentially-spaced stator blades, which are fixed, and a row of rotor blades, which rotate about a central axis or shaft. In operation, the compressor rotor blades rotate about the shaft, and, acting in concert with the stator blades, compress a flow of air. The supply of compressed air then is used in the combustor to combust a supply of fuel. The resulting flow of hot gases from the combustion is expanded through the turbine and causes the turbine blades to rotate such that the system as a whole acts to convert fuel into mechanical energy.

A combined cycle power plant (or "CCPP") is a power plant that achieves higher thermal efficiency by combining a gas turbine with a steam turbine. In such an arrangement, the high temperature exhaust gas from the gas turbine is routed through a heat recovery steam generator (HRSG) to generate steam, which is then directed through a steam turbine for the generation of power. Coupled with the power generated by the gas turbine, it is possible to improve thermal efficiency compared with the independent power generation by a gas turbine.

For improving thermal efficiency of a CCPP, it is effective to increase the hot gas temperature at the inlet of the gas turbine to a higher temperature. However, even with the latest material and combustion technology, the hot gas temperatures are limited due to life time and emission reasons. To further increase the efficiency of CCPPs, fuel preheating has been proposed. The use of such fuel preheating systems generally improves the overall efficiency. However, conventional fuel heating systems still incur significant energy losses and fail to utilize the efficiencies that are possible. In addition, conventional systems are overly complex and costly to maintain and operate.

BRIEF DESCRIPTION OF THE INVENTION

According to one aspect of the present invention, a combined cycle power plant is provided that includes a gas turbine and a heat recovery steam generator (HRSG) operably engaged to a steam turbine via a water steam cycle that includes multiple pressure levels. The multiple pressure levels may include at least a higher pressure level and a lower pressure level. The combined cycle power plant may further include a fuel line configured to deliver a fuel to a combustion system, and a fuel preheater for preheating the fuel before delivery to the combustion system. A higher pressure feedwater line may be configured to deliver a higher pressure feedwater to: a higher pressure boiler associated with the higher pressure level; and a higher pressure feedwater branch that branches from the higher pressure feedwater line. The higher pressure feedwater branch may engage and extend through the fuel preheater, and be defined as including upstream and downstream segments defined to each side of the fuel preheater. A lower pressure feedwater line may deliver a lower pressure feedwater to: a lower pressure boiler associated with the lower pressure level; and a lower pressure feedwater branch that branches from the lower pressure feedwater line. The system may include a junction point at which the downstream segment of the higher pressure feedwater branch combines with the lower pressure feedwater branch, and a combined feedwater line may extend from the junction point for directing the combined feedwater. The first heat exchanger may be configured for exchanging heat between: the combined feedwater delivered to the first heat exchanger by the combined feedwater line; and the fuel within of the fuel line. The second heat exchanger may be configured for exchanging heat between: the higher pressure feedwater that is delivered to the first heat exchanger by the upstream segment of the higher pressure feedwater branch; and the fuel within the fuel line.

These and other advantages and features will become more apparent from the following description taken in conjunction with the drawings.

BRIEF DESCRIPTION OF THE DRAWING

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features without limitation, by way of example with reference to the drawings.

DETAILED DESCRIPTION OF THE INVENTION

Figure 1:
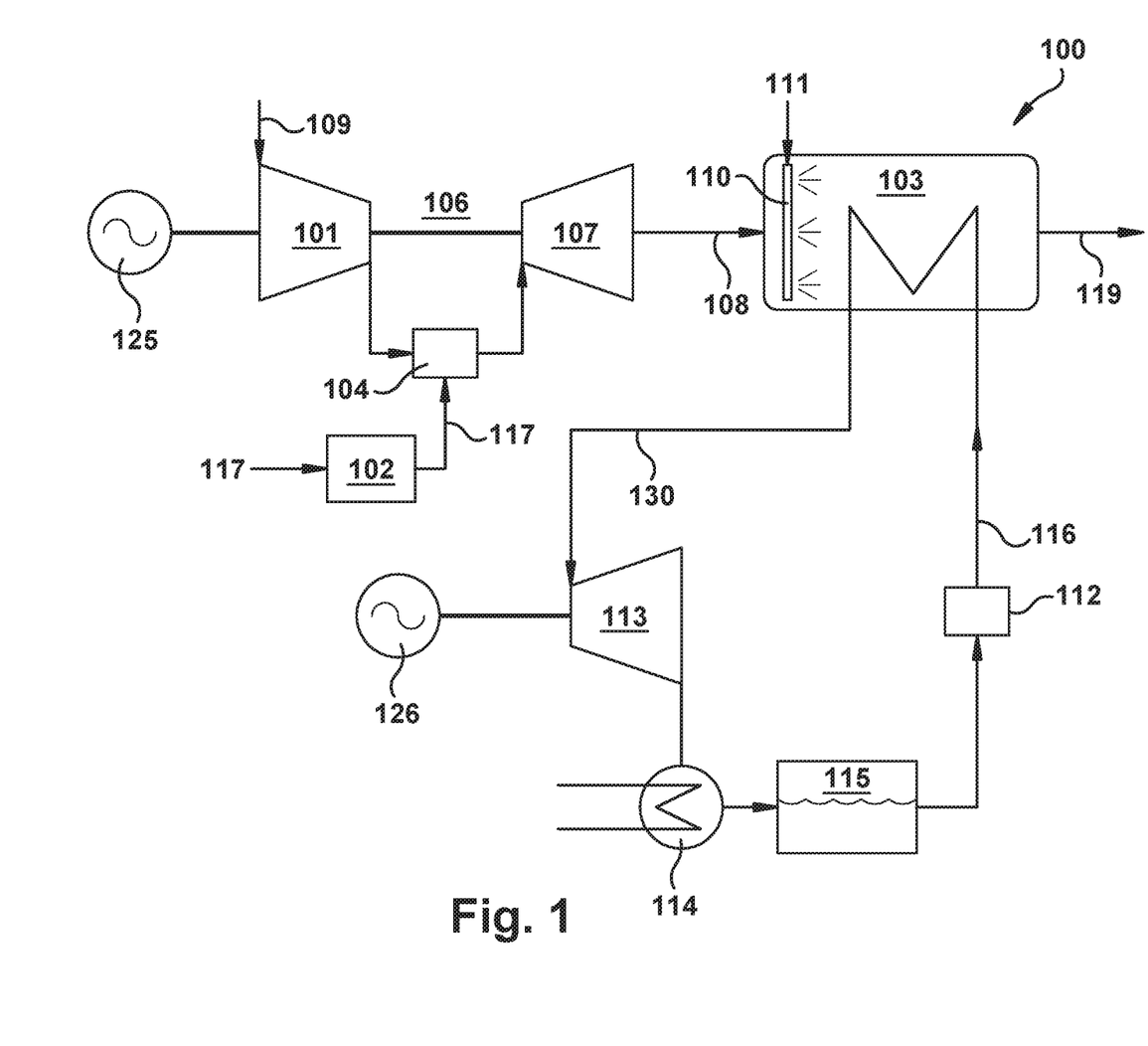
FIG. 1 schematically shows a combined cycle power plant with a gas turbine and a heat steam recovery generator that includes a duct burner and a fuel preheater.

With reference to FIG. 1, an exemplary power plant is shown in which the proposed systems and methods of the present application may be implemented. As shown, the power plant may be a combined cycle power plant ("CCPP") 100. In a typical arrangement, the CCPP 100 includes a fuel preheater 102. As shown, the exemplary CCPP 100 may further include a heat recovery steam generator ("HRSG") 103 that, optionally, is equipped with a supplementary or duct burner 110.

As illustrated, within the CCPP 100, a gas turbine 106, which drives a generator 125, is supplied with compressor inlet gas 109 and a fuel via a fuel line 117. In operation, the compressor inlet gas 109 is compressed in a compressor 101, and the fuel within the fuel line 117 is heated or preheated within the fuel preheater 102. The compressed inlet gas 109 is used for combusting the fuel within a combustor 104, and the resulting pressurized flow of hot combustion gases is expanded though a turbine 107. As will be appreciated, the main outputs of the gas turbine 106 are electric power, generated via a connection between the gas turbine 106 and the first generator 125, and hot flue gas 108 that exits the turbine 107.

As further illustrated, the hot flue gas 108 expelled from the gas turbine 106 may be directed through the HRSG 103, which generates steam for expansion through a steam turbine 113. In the HRSG 103 or the flue gas duct, which extends between the gas turbine 106 and the HRSG 103, a duct burner 110 can optionally be integrated. As shown, the duct burner 110 is supplied with a fuel via fuel line 111, which, optionally, also may be heated by the preheater.

The steam turbine 113 is either arranged as a single shaft configuration with the gas turbine 106 and the first generator 125, or, as shown, is arranged as a multi-shaft configuration to drive a second generator 126. The steam leaving the steam turbine 113 is condensed in the condensor 114. The condensate is collected in a feedwater tank 115, re-pressurized by a feedwater pump 112 and returned to the HRSG 109. In FIG. 1, only one feedwater pump 112, one line for the feedwater 116, and one steam turbine 113 are shown. As will be appreciated, in FIG. 1, the typical steam cycle has been simplified and shown without different steam pressure levels, feedwater pumps, etc. An alternative arrangement that includes multiple lines and pressures for the feedwater is provided in FIG. 2.

Figure 2:
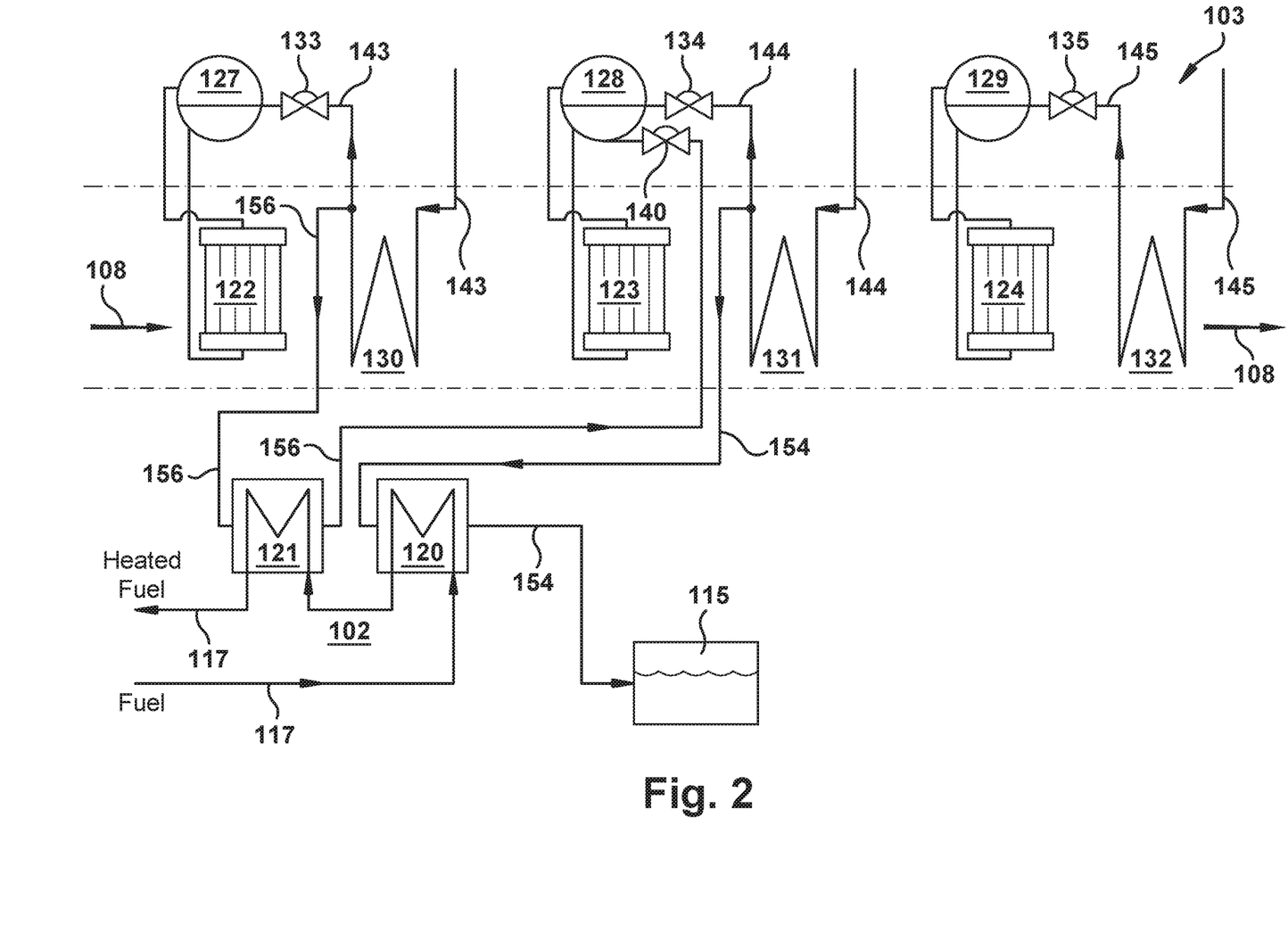
FIG. 2 schematically shows a heat steam recovery generator with three pressure levels and fuel preheater.

With reference now to FIG. 2, depending on the design of the HRSG, the feedwater may be pressurized to two, three, or more pressure levels. Accordingly, the number of feedwater pumps, feedwater supply lines, and steam turbines may correspondingly increase to the number of pressure levels. As will be appreciated, based on the number of pressure levels, HRSGs can be categorized into single pressure and multi pressure types. Single pressure HRSGs have only one steam drum and steam is generated at single pressure level, whereas multi pressure HRSGs employ number of steam drums and generate steam at multiple pressures.

As depicted in FIG. 2, a common type of HRSG is a triple pressure HRSG that consists of three sections, which will be referred to herein as: a low pressure section, an intermediate pressure section, and a high pressure section. Each section may have a steam drum and an evaporator section where water is converted to steam. As used herein, reference to such low pressure, intermediate pressure, and high pressure sections or levels refers to a triple pressure HRSG, whereas reference to merely higher and lower pressure sections or levels is intended to generally refer to any two pressure levels within an HRSG that has multiple pressure levels.

As will be appreciated, FIG. 2 shows a HRSG 103 with three pressure sections or levels (low, intermediate, and high pressure) and a fuel preheater 102. The hot flue gas 108 from the gas turbine 106 flows through the HRSG 103. More specifically, the hot flue gas 108 sequentially pass through: a high pressure evaporator 122 and high pressure economizer 130; an intermediate pressure evaporator 123 and intermediate pressure economizer 131; and a low pressure evaporator 124 and low pressure economizer 132. A superheater (not shown) may be arranged upstream of each of the evaporators 122, 123, 124 within the flow path of the hot flue gas 108. After the useful heat is extracted from the flue gas, the flue gas may exit the HRGS 103 and be directed to the stack.

As further indicated, a feedwater system provides feedwater to the components of the HRSG 103. Specifically, high pressure feedwater is supplied to the high pressure economizer 130 via a high pressure feedwater line 143. Likewise, intermediate pressure feedwater is supplied to the intermediate pressure economizer 131 via an intermediate pressure feedwater line 144, and low pressure feedwater is supplied to the low pressure economizer 132 via a low pressure feedwater line 145. As shown, each of the feedwater lines 143, 144, 145 continues through the corresponding one of the economizers 130, 131, 132 and delivers feedwater to a high pressure drum 127, intermediate pressure drum 128, and low pressure drum 129, also referred to as boilers, respectively. The flow of high pressure feedwater to the high pressure drum 127 may be controlled by a high pressure feedwater control valve 133. The flow of intermediate pressure feedwater to the intermediate pressure drum 128 may be controlled by an intermediate pressure feedwater control valve 134. And, the flow of low pressure feedwater to the low pressure drum 129 may be controlled by a low pressure feedwater control valve 135.

During operation, water from the high pressure drum 127 is evaporated in the high pressure evaporator 122 and returned as steam to the high pressure drum 127. Water from the intermediate pressure drum 128 is evaporated in the intermediate pressure evaporator 123 and returned as steam to the intermediate pressure drum 128. And, water from the low pressure drum 129 is evaporated in the low pressure evaporator 124 and returned as steam to the low pressure drum 129. The steam of each drum 127, 128, 129 may be fed to super heaters (not shown) and then to high, intermediate, and low pressure steam turbines, respectively.

The fuel preheater 102 is supplied feedwater to preheat the fuel within the fuel line 117. For example, as shown, the intermediate pressure feedwater line 144 may supply an intermediate pressure feedwater to a line that branches off from it. This branching line will be referred to herein as an "intermediate pressure feedwater branch 154". More specifically, as illustrated, the intermediate pressure feedwater branch 154 branches from the intermediate pressure feedwater line 144 at a point that is downstream of the intermediate pressure economizer 131. From this branching point, the intermediate pressure feedwater branch 154 directs intermediate pressure feedwater to a first heat exchanger 120 of the fuel preheater 102, which is configured to use the intermediate pressure feedwater to heat the fuel within fuel line 117. From the first heat exchanger 120, the intermediate pressure feedwater branch 154 continues so to ultimately deliver the used intermediate pressure feedwater to a feedwater tank 115.

As also shown, the fuel preheater 102 may use a supply of high pressure feedwater to further preheat the fuel within the fuel line 117. As shown, the high pressure feedwater line 143 may supply high pressure feedwater to a line that branches off from it. In this case, the branching line which will be referred to herein as a "high pressure feedwater branch 156". More specifically, as illustrated, the high pressure feedwater branch 156 branches from the high pressure feedwater line 143 at a point that is downstream of the high pressure economizer 130. From this branching point, the high pressure feedwater branch 156 directs high pressure feedwater to a second heat exchanger 121 of the fuel preheater 102, which is configured to use the high pressure feedwater to heat the fuel within the fuel line 117. From the second heat exchanger 121, the high pressure feedwater branch 156 continues so to ultimately deliver the used high pressure feedwater to the intermediate pressure drum 128 for use therein.

Figure 3:
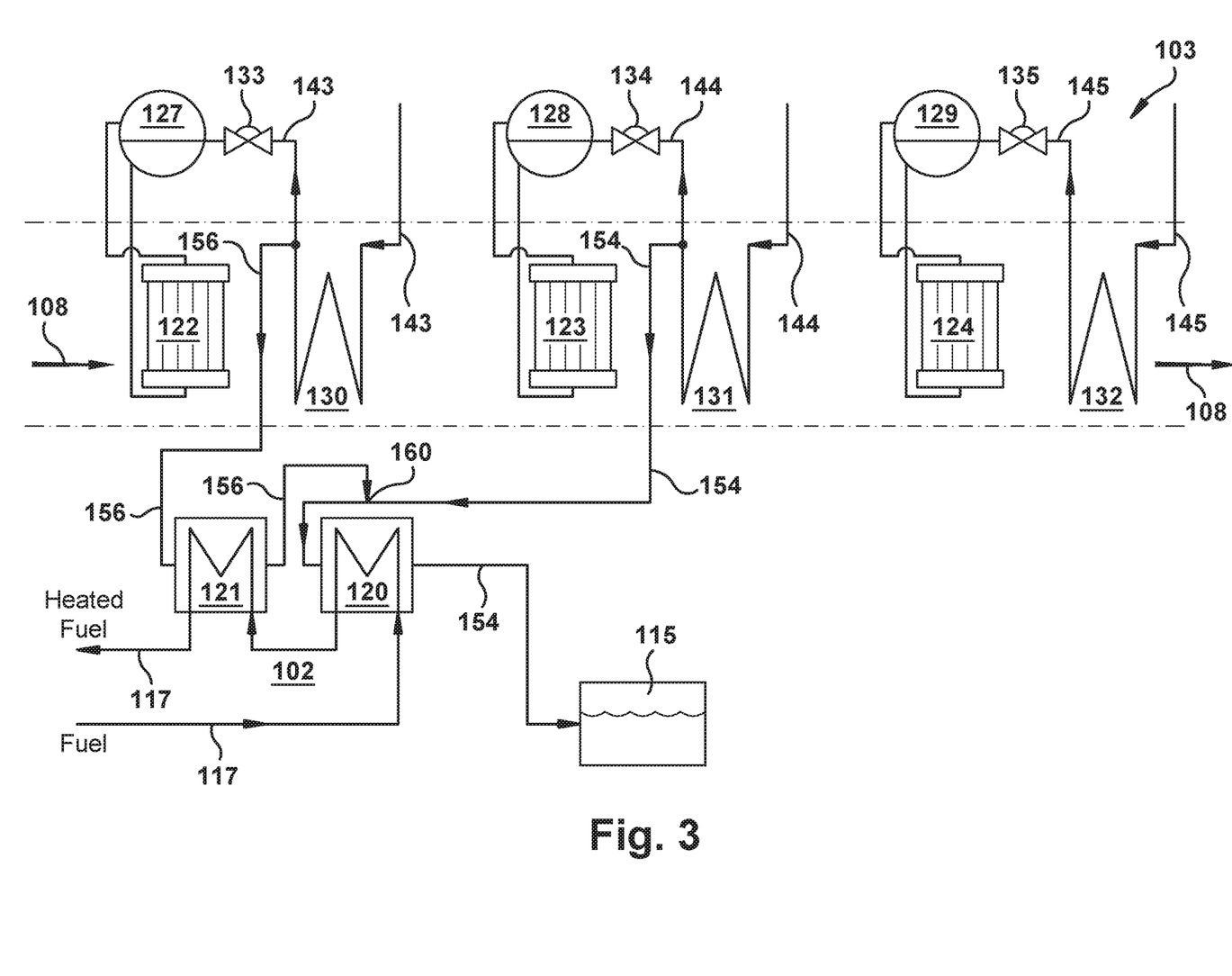
FIG. 3 schematically shows a heat steam recovery generator with three pressure levels and fuel preheater in accordance with an embodiment of the present invention.
Figure 4:
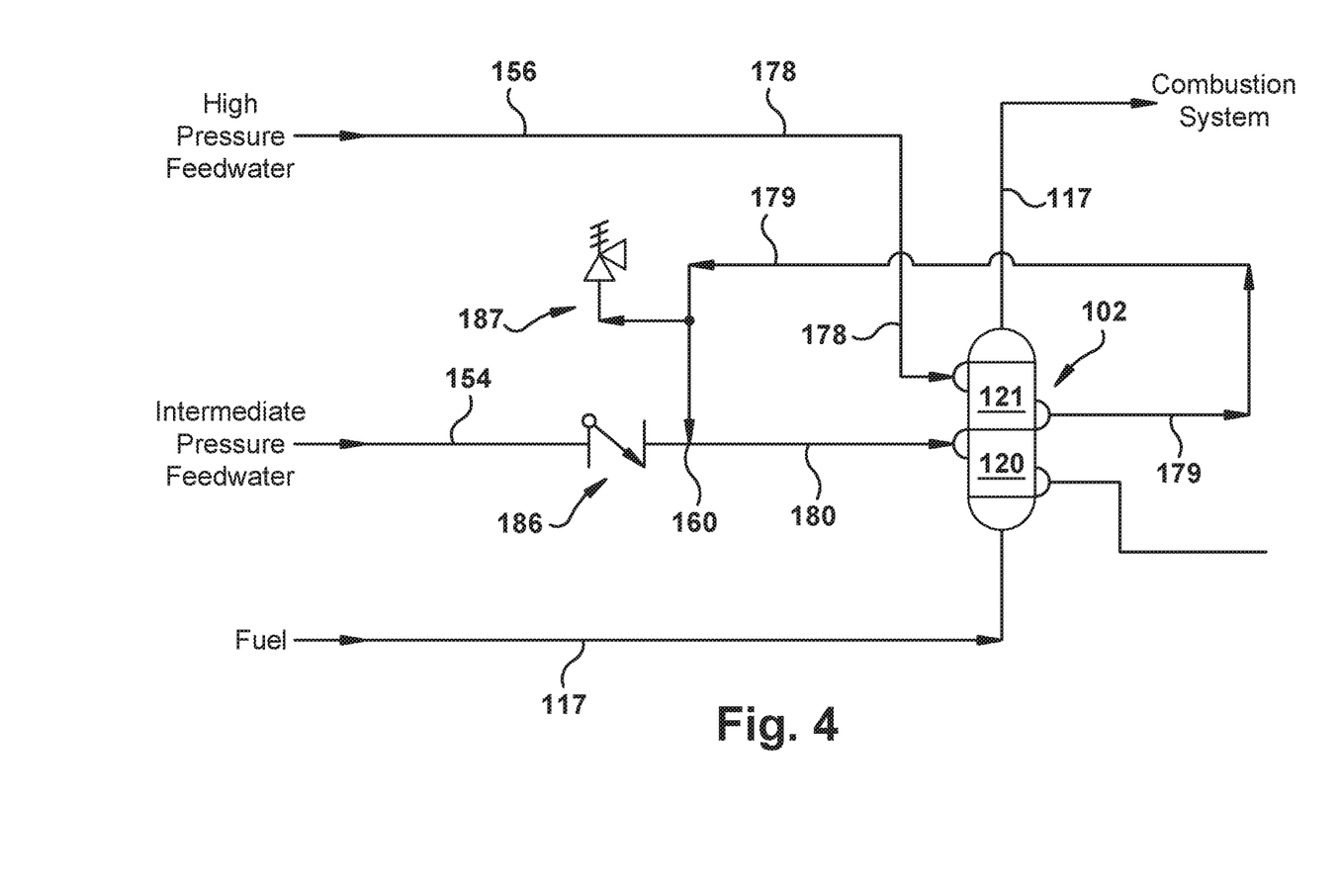
FIG. 4 schematically shows a fuel preheater in accordance with an embodiment of the present invention.

With reference now to FIGS. 3 and 4, the present invention includes fuel heating systems and methods that combine or blend streams of feedwater from the HRSG to preheat the fuel before it is supplied to combustion systems. Specifically, as will be seen, the present invention proposes using a blended stream resulting from the combination of high and low pressure feedwater streams to preheat fuel. According to exemplary embodiments, which may be used in a triple pressure HRSG, a stream of high pressure feedwater is used to preheat fuel and, once this is done, that stream of high pressure feedwater is blended with a stream of intermediate pressure feedwater, and this combined feedwater stream is used to further heat the fuel. Other aspects of the present invention include providing valves that protect the intermediate pressure feedwater system from the higher pressures of the high pressure feedwater system when the streams are combined.

As will be appreciated, the systems and methods described herein offer several operational advantages. For example, by blending the streams in the manner proposed, system efficiencies are enhanced by reducing the amount of intermediate pressure feedwater required for fuel preheating. Further, as will be seen, embodiments of the present invention may be employed to overcome several of the limitations related to the use of intermediate or lower pressure feedwater for fuel preheating. One of these limitations relates to the lower fuel temperatures attainable when using only intermediate pressure feedwater for preheating. Because the high pressure feedwater generally is maintained at such a higher temperature, the use of it with the intermediate pressure feedwater creates a stream having a significantly higher temperature and, thus, greatly improves the capacity of the fuel preheater to increase fuel temperatures through the preheating process. For example, preheating the fuel to temperatures greater than 440° F. is possible when the high pressure feedwater stream is used in the manner described herein. In addition, due to its high temperature and pressure, the disposal of waste high pressure feedwater is often problematic. The blending of the waste high pressure feedwater with the intermediate pressure feedwater alleviates much of this problem by significantly reducing the amount of waste high pressure feedwater produced by the overall system or eliminating it altogether. Of course, the combination of the two systems introduces issues relating to exposing the lower pressure components, such as those of the intermediate pressure system in a triple pressure system, to the elevated pressures and temperatures of the higher pressure system, such as the high pressure level in a triple pressure system. However, as will be seen, the present invention addresses this problem by protecting the lower pressure system with a check valve and/or pressure relief valve upstream of where the two different pressured systems are brought together.

With reference to FIG. 3, an HRSG 103 and fuel preheater 102 are illustrated that have substantially similar configuration as that provided in FIG. 2, with the exception being that, in accordance with the present invention, the high pressure feedwater branch 156 is configured differently downstream of the second heat exchanger 121. Specifically, the high pressure feedwater branch 156 does not continue downstream from the second heat exchange 121 to deliver its used feedwater to the intermediate pressure drum 128. Instead, once it has passed through the second heat exchanger 121, the high pressure feedwater branch 156 continues to a junction point 160 where, in accordance with the present invention, it joins or is combined with the intermediate pressure feedwater branch 154. In this manner, the high pressure feedwater branch 156 delivers high pressure feedwater to a junction point 160 where it is combined with intermediate pressure feedwater, which is delivered to the junction point 160 via the intermediate pressure feedwater branch 154. As discussed more below, this combined flow of high and intermediate pressure feedwater is directed from the junction point 160 to the first heat exchanger 120, where it is used by the fuel preheater 102 to heat the fuel within the fuel line 117.

With specific reference to FIG. 4, a more detailed diagram of the relevant feedwater lines of the HRSG 103 and fuel preheater 102 is provided to better illustrate this exemplary embodiment of the present invention. As stated, the water steam cycle associated with a steam turbine and HRSG of a combined cycle power plant may include multiple pressure levels, and, common among these is an arrangement with three such pressure levels. In such cases, the three pressure levels may be referred to herein as including a high pressure level, an intermediate pressure level, and a low pressure level. A preferred embodiment of the present invention may be used in conjunction with systems having three pressure levels, and the feedwater lines in FIG. 4 are depicted according to this preferred embodiment. Thus, a high pressure feedwater branch 156 and an intermediate pressure feedwater branch 154 are shown, and these may be substantially the same in function and configuration as provided already in relation to these components in the discussion of FIGS. 2 and 3. It should be appreciated, however, that the present invention is not strictly limited to this particular arrangement. Specifically, it should be understood that the present invention may be implemented to combine or blend for the purposes of fuel preheating any two of the feedwater branches corresponding to the different pressure levels within a given multiple pressure systems. Thus, it should be understood that reference to a "high pressure level" and a "low pressure level", without more, is intended merely to indicate differing pressure levels and the components associated with each. More particularly, such designations, without more, simply differentiates between any two of the pressure levels that included within a water steam cycle operating with multiple pressure levels pursuant to the comparative pressure levels between them. Of course, in such case, the "high pressure level" designation refers to the pressure level that is the higher of the two, while the "low pressure level" designation refers to the pressure level that is the lower of the two.

As further shown in FIG. 4, a fuel line 117 is provided. As stated, the fuel line 117 delivers fuel to one or more of the combustion systems of the power plant. As discussed above, such combustion systems may include a combustor of a gas turbine and/or a duct burner positioned in an exhaust duct of the gas turbine. The fuel line 117 may flow through and thereby be operably engaged by the fuel preheater 102. As before, the fuel preheater 102 may include a first and second heat exchangers 120, 121.

With reference to both FIGS. 3 and 4, the high pressure feedwater line 143 may be configured to deliver high pressure feedwater to both the high pressure drum 127 as well as the high pressure feedwater branch 156. The high pressure feedwater branch 156 may extend through and operably engage the fuel preheater 102 and, specifically, operably engage the second heat exchange 121 of the fuel preheater 102. For descriptive purposes, the high pressure feedwater branch 156 may be divided into upstream and downstream segments, which are defined relative to the fuel preheater 102. In doing this, an upstream segment 178 of the high pressure feedwater branch 156 is the portion that carries high pressure feedwater to the fuel preheater 102, while a downstream segment 179 of the high pressure feedwater branch 156 is the portion that carries high pressure feedwater away from the fuel preheater 102. Put another way, the upstream segment 178 is the portion of the high pressure feedwater branch 156 that extends between the high pressure feedwater line 143 and the fuel preheater 102, while the downstream segment 179 is the portion of the high pressure feedwater branch 156 extends between the fuel preheater 102 and the junction point 160. With regard to the intermediate pressure feedwater line 154, it may be configured to deliver intermediate pressure feedwater to both the intermediate pressure drum 128 and the intermediate pressure feedwater branch 154.

The present invention, as already mentioned, includes a junction point 160 at which the downstream segment 179 of the high pressure feedwater branch 156 combines with the intermediate pressure feedwater branch 154. Downstream of this junction point 160, the present invention includes what will be referred to as a "combined feedwater line" 180. The combined feedwater line 180, thus, extends away from the junction point 160 and toward the fuel preheater 102. As will be appreciated, the combined feedwater line 180 is configured for directing the combined flow of feedwater that is brought together at the junction point 160. This combined flow will be referred to herein as "combined feedwater", and, as will be appreciated, is made up of both: 1) the high pressure feedwater delivered to the junction point 160 by the downstream segment 179 of the high pressure feedwater branch 156; and 2) the intermediate pressure feedwater delivered to the junction point 160 by the intermediate pressure feedwater branch 154.

The fuel preheater 102, as stated, may include two heat exchangers. According to preferred embodiments, the first heat exchanger 120 may be configured to exchange energy or heat between: 1) the combined feedwater delivered to the first heat exchanger 120 by the combined feedwater line 180; and 2) the fuel flowing through fuel line 117. The second heat exchanger 121 may be configured to exchange heat between: 1) the high pressure feedwater that is delivered to the second heat exchanger 121 by the upstream segment 178 of the high pressure feedwater branch 156; and 2) the fuel flowing through the fuel line 117. Relative to a flow direction of the fuel through the fuel line 117, the second heat exchanger 121 may reside downstream of the first heat exchanger 120, as depicted in FIG. 4.

The present invention may further include aspects for protecting the lower pressure system from the high pressures of the higher pressure system when the differently pressured feedwaters are brought together. Thus, with specific reference to FIG. 4, a check valve 186 and/or a pressure relief valve 187 may be included and positioned as indicated. As will be appreciated, a check valve is a valve that normally allows fluid to flow through it in only one direction. According to a preferred embodiment, as shown, the check valve 186 may be located on the intermediate pressure feedwater branch 154 (which, more generally, is the lower pressured branch of the two being combined) at a position that is upstream relative to the junction point 160. In regard to the pressure relief valve 187, as should be understood, this type of valve is used to control or limit the pressure in a particular line or system. Such a valve may be designed to allow the pressurized fluid to flow through an auxiliary passage out of the system when a pressure limit is exceeded. For example, a pressure relief valve may be designed or set to open once a predetermined pressure limit is reached in order to protect pressure vessels and other equipment from being subjected to pressures that exceed their design limits. According to preferred embodiments of the present invention, as depicted in FIG. 4, the system may include a pressure relief valve 187. According to an exemplary embodiment, the pressure relief valve 187 may be located on the downstream segment 179 of the high pressure feedwater branch 156 (which, more generally, is the higher pressured branch of the two being combined). Other locations are also possible for the pressure relieve valve. For example, according to an alternative embodiment, the pressure relief valve 187 is located on the combined feedwater line 180.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A combined cycle power plant comprising a gas turbine and a heat recovery steam generator (HRSG) operably engaged to a steam turbine via a water steam cycle that includes multiple pressure levels, the multiple pressure levels comprising at least a higher pressure level and a lower pressure level, the combined cycle power plant further comprising:
    a fuel line configured to deliver a fuel to a combustion system;
    a fuel preheater for preheating the fuel before delivery to the combustion system, the fuel preheater comprising first and second heat exchangers;
    a higher pressure system comprising a higher pressure feedwater line configured to deliver a higher pressure feedwater to:
        a higher pressure boiler associated with the higher pressure level; and
        a higher pressure feedwater branch that branches from the higher pressure feedwater line, wherein the higher pressure feedwater branch engages and extends through the fuel preheater and comprises an upstream segment and a downstream segment;
    a lower pressure system comprising a lower pressure feedwater line for delivering a lower pressure feedwater to:
        a lower pressure boiler associated with the lower pressure level; and
        a lower pressure feedwater branch that branches from the lower pressure feedwater line;
    a junction point at which the downstream segment of the higher pressure feedwater branch combines with the lower pressure feedwater branch;
    a combined feedwater line extending from the junction point that directs a combined feedwater, wherein the combined feedwater comprises a combined flow of: the higher pressure feedwater delivered to the junction point by the downstream segment of the higher pressure feedwater branch, and the lower pressure feedwater delivered to the junction point by the lower pressure feedwater branch;
    a check valve disposed on the lower pressure feedwater branch at a position that is upstream relative to the junction point; and
    a pressure relief valve disposed on the downstream segment of the higher pressure feedwater branch or the combined feedwater line, wherein the check valve and the pressure relief valve are configured to protect the lower pressure system from higher pressures originating in the higher pressure system due to the higher pressure feedwater combining with the lower pressure feedwater at the junction point;

wherein the first heat exchanger is configured for exchanging heat between:
the combined feedwater delivered to the first heat exchanger by the combined feedwater line; and
the fuel within the fuel line;

wherein the second heat exchanger is configured for exchanging heat between:
the higher pressure feedwater that is delivered to the second heat exchanger by the upstream segment of the higher pressure feedwater branch; and
the fuel within the fuel line.

2. The combined cycle power plant according to claim 1, wherein the downstream segment of the higher pressure feedwater branch does not continue downstream from the fuel preheater to deliver the higher pressure feedwater to the lower pressure boiler.

3. The combined cycle power plant according to claim 1, wherein the combustion system comprises at least one of: a combustor of the gas turbine or a duct burner positioned in an exhaust duct of the gas turbine.

4. The combined cycle power plant according to claim 1, wherein:
the upstream segment of the higher pressure feedwater branch extends between the higher pressure feedwater line and the fuel preheater, and the upstream segment of the higher pressure feedwater branch carries the higher pressure feedwater to the fuel preheater; and
the downstream segment of the higher pressure feedwater branch extends between the fuel preheater and the junction point, and the downstream segment of the higher pressure feedwater branch carries the higher pressure feedwater away from the fuel preheater.

5. The combined cycle power plant according to claim 4, wherein:
the higher pressure feedwater line extends between a higher pressure economizer and the higher pressure boiler; and
the lower pressure feedwater line extends between a lower pressure economizer and the lower pressure boiler.

6. The combined cycle power plant according to claim 5, wherein:
the higher pressure feedwater branch branches from the higher pressure feedwater line between the higher pressure economizer and the higher pressure boiler; and
the lower pressure feedwater branch branches from the lower pressure feedwater line between the lower pressure economizer and the lower pressure boiler.

7. The combined cycle power plant according to claim 1, wherein the multiple pressure levels comprises three pressure levels: a high pressure level corresponding to the higher pressure level, an intermediate pressure level corresponding to the lower pressure level, and a low pressure level below the intermediate pressure level.

8. The combined cycle power plant according to claim 1, wherein the check valve comprises a valve that allows fluid to flow in only one direction through the check valve to enable flow of the lower pressure feedwater through the lower pressure feedwater branch from the lower pressure feedwater line to the junction point.

9. The combined cycle power plant according to claim 1, wherein the pressure relief valve comprises a valve that allows a pressurized fluid to exit through an auxiliary passage when a pressure limit is exceeded.

10. The combined cycle power plant according to claim 1, wherein the downstream segment of the higher pressure feedwater branch extends only to the junction point.

11. The combined cycle power plant according to claim 1, wherein the higher pressure feedwater supplied to the junction point by the downstream segment of the higher pressure feedwater branch has a higher temperature than the lower pressure feedwater supplied to the junction point by the lower pressure feedwater branch, such that the combined feedwater in the combined feedwater line downstream from the junction point has a higher temperature than the lower pressure feedwater supplied to the junction point.

12. A combined cycle power plant comprising:
a gas turbine;
a heat recovery steam generator (HRSG) operably engaged to a steam turbine via a water steam cycle that includes three pressure levels, wherein the three pressure levels comprise: a high pressure level; an intermediate pressure level; and a low pressure level;
a fuel line configured to deliver a fuel to a combustion system;
a fuel preheater for preheating the fuel before delivery to the combustion system;
a high pressure system comprising a high pressure feedwater branch that operably engages and extends through the fuel preheater, wherein the high pressure feedwater branch comprises upstream and downstream segments defined to each side of the fuel preheater such that:
the upstream segment carries a higher pressure feedwater to the fuel preheater; and
the downstream segment carries the higher pressure feedwater away from the fuel preheater;
an intermediate pressure system comprising an intermediate pressure feedwater branch;
a junction point at which the downstream segment of the high pressure feedwater branch is combined with the intermediate pressure feedwater branch;
a combined feedwater line extending from the junction point for directing a combined feedwater therefrom, wherein the combined feedwater line operably engages and extends through the fuel preheater;
a first heat exchanger of the fuel preheater that is configured to exchange heat between the combined feedwater within the combined feedwater line and the fuel within the fuel line;
a second heat exchanger of the fuel preheater that is configured to exchange heat between the higher pressure feedwater within the high pressure feedwater branch and the fuel within the fuel line;
a check valve disposed on the intermediate pressure feedwater branch at a position that is upstream relative to the junction point; and
a pressure relief valve disposed on the downstream segment of the high pressure feedwater branch or the combined feedwater line, wherein the check valve and the pressure relief valve are configured to protect the intermediate pressure system from higher pressures originating in the high pressure system.

13. The combined cycle power plant according to claim 12, wherein the downstream segment of the high pressure feedwater branch does not continue downstream from the fuel preheater to deliver the higher pressure feedwater to an intermediate pressure boiler.

14. The combined cycle power plant according to claim 12, comprising:
- a high pressure boiler and a high pressure economizer associated with the high pressure level;
- an intermediate pressure boiler and an intermediate pressure economizer associated with the intermediate pressure level;
- a high pressure feedwater line that extends between the high pressure economizer and the high pressure boiler; and
- an intermediate pressure feedwater line that extends between the intermediate pressure economizer and the intermediate pressure boiler;
- wherein the high pressure feedwater branch is coupled to the high pressure feedwater line at a position located between the high pressure economizer and the high pressure boiler; and
- wherein the intermediate pressure feedwater branch is coupled to the intermediate pressure feedwater line at a position located between the intermediate pressure economizer and the intermediate pressure boiler.

15. The combined cycle power plant according to claim 12, wherein the check valve is configured to enable flow of an intermediate pressure feedwater toward the junction point and to block flow of the high pressure feedwater against the flow of the intermediate pressure feedwater.

16. The combined cycle power plant according to claim 12, wherein the pressure relief valve is disposed on the downstream segment of the high pressure feedwater branch between the second heat exchanger and the junction point.

17. The combined cycle power plant according to claim 14, wherein the combined feedwater comprises a combined flow of:
- the higher pressure feedwater delivered to the junction point at a first temperature by the downstream segment of the high pressure feedwater branch; and
- the intermediate pressure feedwater delivered to the junction point at a second temperature by the intermediate pressure feedwater branch, wherein the first temperature is higher than the second temperature, and the combined feedwater has a third temperature higher than the second temperature.

18. A system, comprising:
a fuel heating system, comprising:
- a fuel path configured to supply a fuel flow to a combustion system;
- a first fluid path configured to couple to a first section of a heat recovery steam generator (HRSG) to receive a first flow of a first fluid;
- a second fluid path configured to couple to a second section of the HRSG to receive a second flow of a second fluid, wherein the second section operates at a higher pressure than the first section of the HRSG;
- a combined fluid path coupled to the first and second fluid paths, wherein the combined fluid path is configured to receive a combined flow of the first and second fluids received from the first and second fluid paths;
- a first heat exchanger disposed along the combined fluid path and disposed along the fuel path, wherein the first heat exchanger is configured to transfer heat from the combined flow to the fuel flow;
- a second heat exchanger disposed along the second fluid path and disposed along the fuel path downstream from the first heat exchanger;
- a check valve disposed along the first fluid path; and
- a pressure relief valve disposed along the second fluid path downstream of the second heat exchanger or disposed along the combined fluid path, wherein the check valve and the pressure relief valve are configured to protect the first section of the HRSG from higher pressures originating in the second section of the HRSG.

19. The system according to claim 18, comprising the combustion system, the HRSG, a gas turbine driven by a combustor of the combustion system, or a combination thereof.

20. The system according to claim 18, wherein the first section of the HRSG comprises at least one of a first economizer, a first boiler, or a first evaporator, and wherein the second section of the HRSG comprises at least one of a second economizer, a second boiler, or a second evaporator.

* * * * *